April 30, 1940.  J. B. TEGARTY  2,199,144

METHOD OF INJECTING THERMOPLASTIC MATERIAL INTO A MOLD

Filed May 3, 1937  4 Sheets-Sheet 1

INVENTOR.
JOHN B. TEGARTY
BY
his ATTORNEY.

April 30, 1940. J. B. TEGARTY 2,199,144

METHOD OF INJECTING THERMOPLASTIC MATERIAL INTO A MOLD

Filed May 3, 1937 4 Sheets-Sheet 2

INVENTOR.
JOHN. B. TEGARTY
BY
his ATTORNEY.

April 30, 1940.    J. B. TEGARTY    2,199,144
METHOD OF INJECTING THERMOPLASTIC MATERIAL INTO A MOLD
Filed May 3, 1937    4 Sheets-Sheet 3
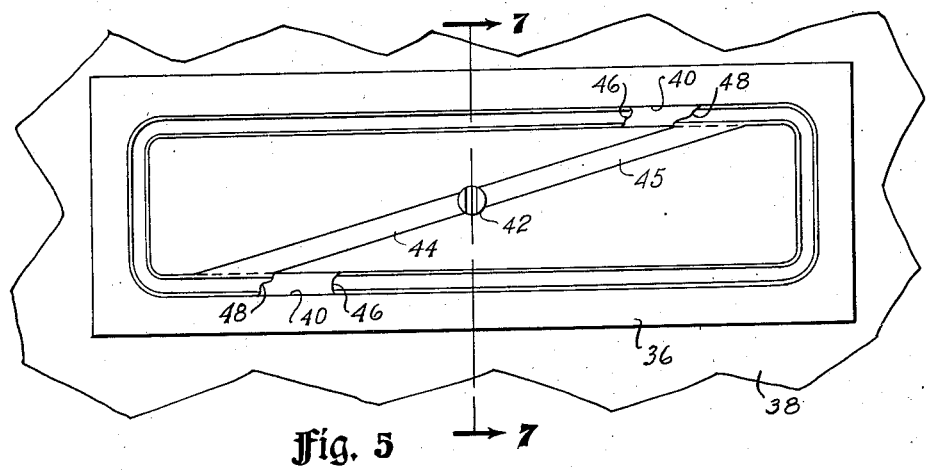
Fig. 5
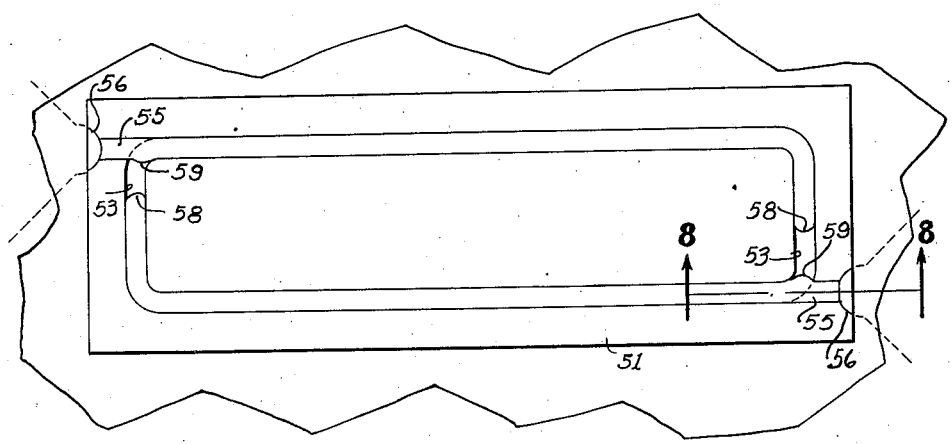
Fig. 6
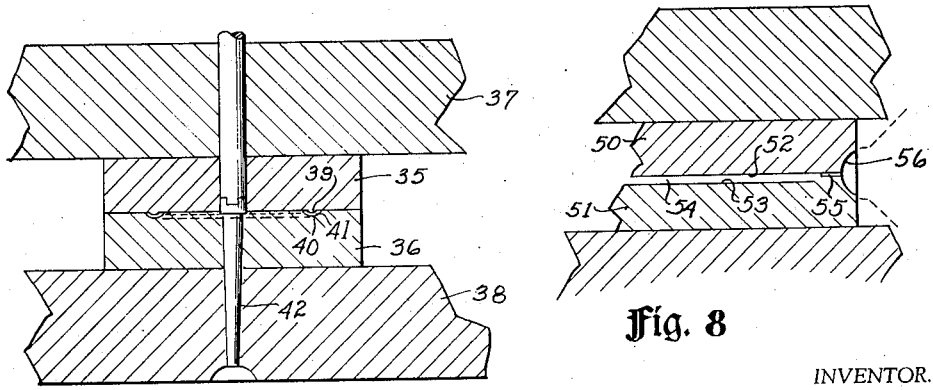
Fig. 7
Fig. 8
INVENTOR.
JOHN B. TEGARTY
BY
ATTORNEY.

April 30, 1940.  J. B. TEGARTY  2,199,144
METHOD OF INJECTING THERMOPLASTIC MATERIAL INTO A MOLD
Filed May 3, 1937  4 Sheets-Sheet 4
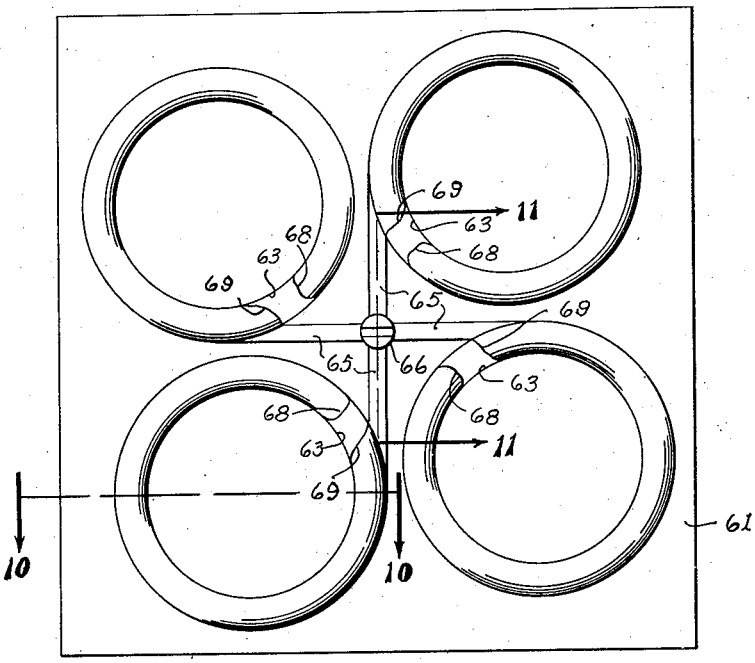
Fig. 9
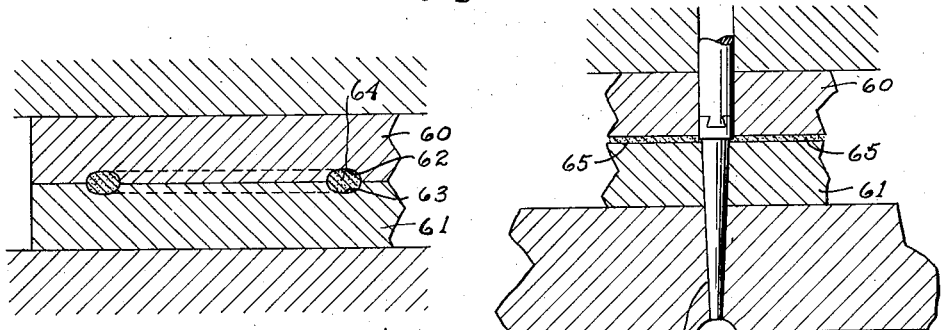
Fig. 10
Fig. 11
INVENTOR.
JOHN B. TEGARTY
BY
ATTORNEY.

Patented Apr. 30, 1940

2,199,144

UNITED STATES PATENT OFFICE 2,199,144

METHOD OF INJECTING THERMOPLASTIC MATERIAL INTO A MOLD

John B. Tegarty, St. Clair, Mich., assignor, by mesne assignments, to The Standard Products Company, Port Clinton, Ohio, a corporation of Ohio Application May 3, 1937, Serial No. 140,376

10 Claims. (Cl. 18—55)

This invention relates to an improved method and apparatus for molding an article of thermoplastic material by injection and deals particularly with the angular direction at which the material enters the mold cavity, whereby an effective weld between relatively moving streams of material can be obtained and therefore a smooth finish over the entire surface of the article can be produced.

In prior methods for improving the surface of articles molded by injection, described in applications Serial No. 132,849, filed March 24, 1937, and Serial No. 139,774, filed April 29, 1937, the weld line or meeting zone where the streams of material which are flowing into the cavity converge and unite is of primary importance. The first application seeks to eliminate the weld line by drawing off the material adjacent the weld line into pockets surrounding the mold cavity. The other application provides heat to be concentrated at the zone where the streams of material unite for the purpose of causing the streams to merge into each other.

The present invention is likewise concerned with the formation of a smooth strong weld line, but the formation thereof is accomplished in an entirely different manner from the aforesaid applications.

One of the principal objects of the present invention is to inject the material in a manner which eliminates undesirable phenomena occasioned by prior methods of injection while at the same time utilizing advantageously the effects by which the undesirable phenomena were previously created.

Another object is to provide a method and apparatus for molding an article of thermoplastic material by injecting the material into a peripherally closed mold cavity in a direction so that the material is constrained to flow or move in a single stream from a given source of injection, the single stream being relatively cool and less plastic and eventually causing this stream to merge into the fresh and more plastic material adjacent the entrance into the cavity, whereby to produce an absolutely smooth surface which is free from any apparent cracks or scratches over the entire area.

More specifically, an object of the present invention is to eliminate the direct impingement of the material at an abrupt angle on an insert being coated and to utilize the initial velocity of injection for carrying the material more rapidly to its final position within the mold, whereby the energy formerly dissipated and causing distortion and displacement of the insert is utilized in a manner to effect a positive advantage.

Another object which is particularly important in connection with molding multi-colored coatings or solid articles with color striations is to inject the material substantially tangentially of the cavity or substantially in the direction in which it must flow after entering the mold cavity so that boiling and eddy currents which tend to intermix the colors are reduced to a minimum.

Another object is to inject the material in a manner so that a more uniform temperature of the entire mass of material in the mold cavity is obtained, and the resultant article is coated with a homogeneous coating of uniform characteristics throughout, and the objectionable weld zones heretofore occurring in such mold are substantially eliminated.

Other objects and advantages will become apparent from the consideration of the following specification which is taken in conjunction with the accompanying drawings in which:

Figs. 5 and 6 are plan views of mold sections for making picture frames or molding;

Figs. 7 and 8 are fragmentary sectional views taken along planes indicated by lines 7—7 and 8—8 in Figs. 5 and 6, respectively.

Fig. 9 is a plan view of one section of a multiple cavity mold for making ornamental rings or the like, and Figs. 10 and 11 are fragmentary sectional views of the mold taken along planes indicated by the lines 10—10 and 11—11 of Fig. 9.

While the drawings illustrate only a few of the articles which may be made by the present process, it will be apparent that many other articles not shown may be efficiently produced by the same process without departing from the spirit and scope as defined in the appended claims.

Figure 1:
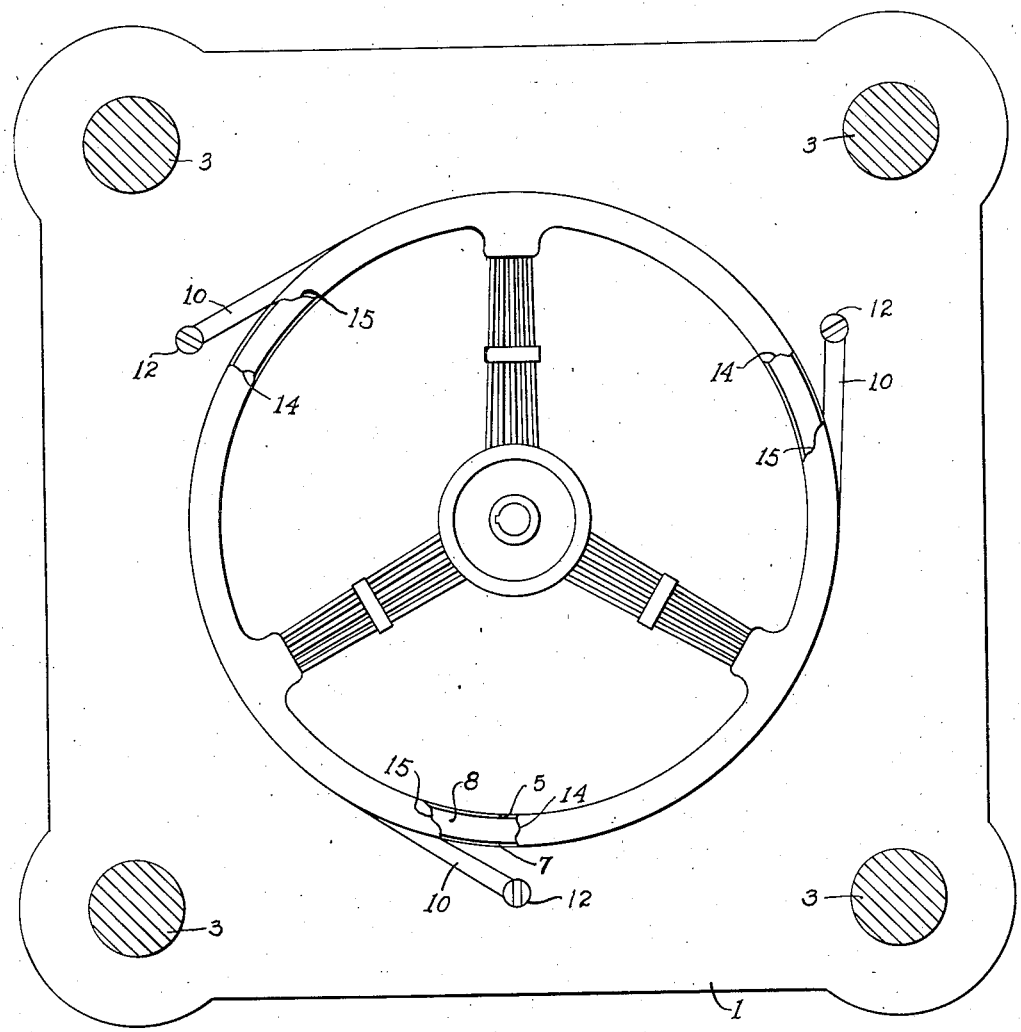
Fig. 1 is a plan view of a mold section showing a steering wheel positioned within the cavity and the substantially tangential position of the gates leading thereto.
Figure 2:
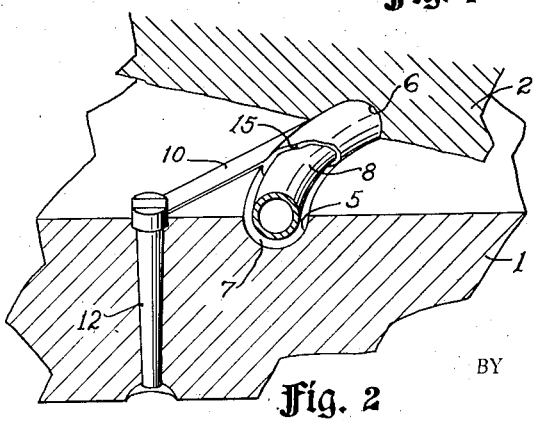
Fig. 2 is a fragmentary perspective view of a portion of the mold in Fig. 1, showing the relative position of gate and cavity.

Referring particularly to Figs. 1 and 2, a mold is shown comprising a lower mold section 1 and an upper mold section 2, each section being mounted for relative reciprocation toward and away from each other on suitable guide rods 3. Annular recesses 5 and 6, in the faces of the mold sections 1 and 2, respectively, cooperate to define a steering wheel rim cavity 7 when the mold sections are brought together.

Positioned centrally within the mold cavity 7 is a suitable steering wheel spider rim 8 which is to be covered with a coating of thermoplastic material. The rim 8 may be held in uniform spaced relation from the walls of the cavity 7 through the medium of the spokes or hub. The thickness of the coating of thermoplastic material is equal to the space between the cavity wall and the surface of the spider rim 8.

Details as to the method and means for holding the spider in the desired position form no part of the present invention and consequently no reference thereto need be made.

Leading to the mold cavity 7 are a number of gates 10 which conduct the material in the plastic state from suitable injecting nozzles, not shown, and sprue passages 12 to the cavity 7. These gates 10 enter the cavity 7 in a direction substantially tangential to the rim annulus.

In the present instance, three such gates have been shown equally spaced around the annulus, but it is apparent that any desired number may be employed to accomplish the objects set forth. Accordingly, three sprue passages 12 and three nozzles are employed for the present mold.

The material, while heated and in the plastic state, is injected from each of the nozzles concurrently and flows through the sprue passages 12 to the gates 10 and into the cavity 7. The gates are arranged at an acute angle or substantially tangential to the annular mold cavity 7 so that the material will flow in an enveloping sleeve around the rim 8 and in the direction in which the material enters the cavity. Thus each entire sleeve of material moves in the same angular direction in the cavity and its associated gate. Each sleeve of material comprises a relatively moving leading edge 14 and a relatively stationary edge 15, the edges 14 moving concurrently in the same angular direction around the rim spider 8 while the edges 15 remain in close proximity with their associated gates 10. The material which forms the edges 14 remains substantially the same while the material forming the edges 15 is constantly changing during the injecting operation.

The temperature of the mold cavity 7 is preferably maintained substantially uniform during the operation of the mold and at such a degree that the material will become sufficiently cooled to set or solidify in a relatively short time, that is, in a matter of a few seconds.

The leading edges 14 of the sleeves of material entering the cavity from the gates 10 are somewhat changed in temperature and plasticity due to their contact with the mold cavity walls as they progress along its path. However, due to the angular direction of injection, the relatively congealed leading edge 14 from one of the gates meets the fresh and more plastic edge 15 from the progressively neighboring gate and flows therewith. Thus each of the edges 14 are changed in temperature and plasticity by their contact with the higher temperature and more plastic edges 15 so that the mass of material in the mold where such contact occurs is at the same temperature. As a result, the mold cavity is filled at the zones of contact with material of substantially the same degree of plasticity and the resultant coating is substantially homogeneous and of the same characteristics. Thus the edges 14 merge into the edges 15 without leaving a trace of where the merging occurred. Instead of the usual cracks or scratches occasioned by injection molding, the entire surface is smooth and free from such flaws.

In addition to obtaining a strong invisible weld, the present method facilitates the production of a more attractive appearance of the surface of the article when various colors of thermoplastic material are employed. Since the material is injected into the mold cavity at an angle to the insert positioned therein, there is much less tendency for the material to eddy and become mixed than there is where the material enters the cavity substantially normal to the surface of the insert. Thus the various colors which comprise the charge injected into the cavity are distributed in sharply contrasting streaks around the rim annulus.

Figure 3:
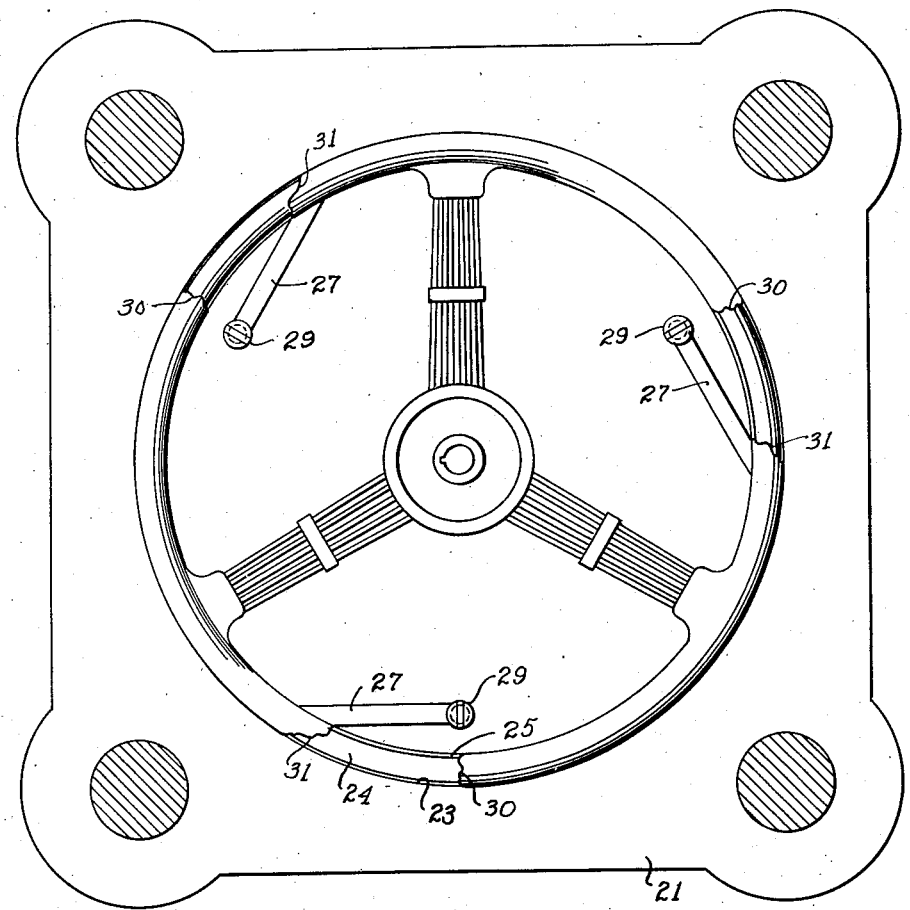
Fig. 3 is a plan view similar to Fig. 1, showing a modification of the gate arrangement.
Figure 4:
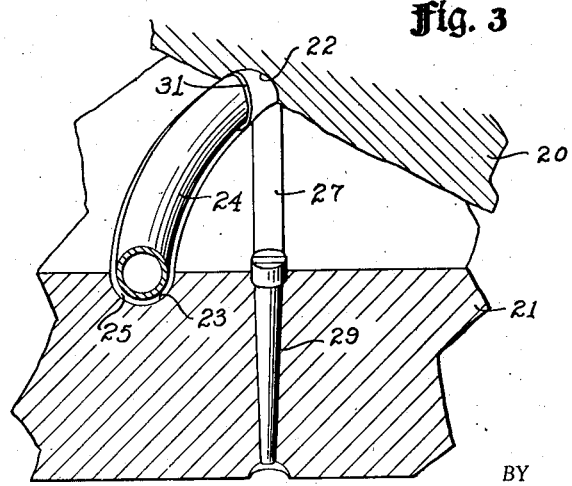
Fig. 4 is a fragmentary perspective view similar to Fig. 2, showing the relationship between the gate and cavity of the mold in Fig. 3.

Referring now to Figs. 3 and 4, a modification of the invention disclosed in Figs. 1 and 2 is shown comprising an upper and a lower mold section 20 and 21, respectively. The upper section 20 is provided with an annular recess 22 and the lower section 21 is provided with a similar recess 23 which registers with the recess 22.

A steering wheel rim annulus 24 is positioned within the recesses 22 and 23 and held in any suitable manner in uniform spaced relation from the walls thereof. The space between the recess walls and the rim annulus 24 provides a continuous annular cavity 25 for receiving the thermoplastic material.

Leading to the cavity 25 are a plurality of gates 27 which are defined by channels formed in the surfaces of the mold sections. In this modification, the gates 27 are disposed inwardly of the annular cavity and are connected therewith at an angle to the general direction in which that portion of the cavity extends. Three such gates have been shown merely by way of illustration. It should be noted, however, that the material entering the annular cavity 25 from each gate 27 is given an initial velocity in the direction of the cavity so that the entire quantity of plastic material flows therein in the same angular direction just as in the previously described form.

This material is forced under pressure from a plurality of nozzles (not shown) into the same number of sprue passages 29 concurrently. From the sprue passages, the material is conducted into the annular cavity through the gates 27.

The angular direction in which the material enters the cavity from each gate causes it to envelop the rim 24 like a sleeve and flow therearound in substantially the same direction. Each sleeve contains a moving edge 30 and a relatively stationary edge 31. The injection pressure on the plastic material continues until the relatively congealed edge 30 merges into the more plastic edge 31 adjacent the entrance of the gate 27 into the cavity 25. Thus a smooth flawless surface over the entire area of the steering wheel rim is produced as herein described.

The same method may be employed in the molding of picture frames or other similar articles as disclosed in Figs. 5 to 8, inclusive. Referring particularly to Figs. 5 to 7, the mold comprises a pair of mold sections 35 and 36 which may be mounted on relatively movable platens 37 and 38, respectively, which in turn are carried in a suitable press. Each of the mold sections 35 and 36 is provided with a mold surface 39 and 40, respectively, which together define a mold cavity 41.

In the present instance, the cavity 41 is in the shape of a rectangle as shown in Fig. 5. The plastic material is conducted to the cavity 41 through a sprue passage 42 in the platen 38 and mold section 36 to a pair of gates 44 and 45. These gates 44 and 45 lead from the sprue passage 42 and enter the cavity 41 on a gradual angle with respect to the side of the rectangular cavity. Thus the material from any one gate is forced around the cavity in the general direction of the cavity. The material moves concurrently in streams having leading edges 46 which eventually merge into relatively more plastic edges 48 adjacent the opening of the gates 44 and 45 into the cavity 41. Although there is no insert or core shown in the present modification, the merging of the streams occurs in a similar manner as described.

Referring now to Figs. 6 and 8, the mold for making substantially the same frame as in Figs. 5 and 7 is shown comprising separable mold sections 50 and 51 having mold surfaces 52 and 53, respectively, which cooperate to define a rectangular mold cavity 54. Gates 55 in the mold sections connect with the cavity at diagonally opposite corners of the cavity. These gates 55 are preferably in direct alignment with opposite sides of the rectangular cavity as shown in Fig. 6.

The gates 55 open outwardly in cup-shaped recesses 56 formed in opposite sides of the mold sections, one-half of each recess 56 being in each mold section 50 and 51, as shown in Fig. 8. When the mold sections are closed, the nozzles are brought into contact with the recesses 56 preparatory to introducing the plastic material through the gates into the cavity.

In this modification, the material enters the rectangular cavity 54 in direct alignment with parallel sides thereof and as the streams proceed around the cavity, leading edges 58 of the streams merge and unite with more plastic edges 59 adjacent the gate entrance as best shown in Fig. 6.

The modification disclosed in Figs. 9 to 11 inclusive shows a multiple cavity mold for the production of rings and comprises separable sections 60 and 61 each having a plurality of annular recesses 62 and 63, respectively, defining annular cavities 64. A gate 65 enters each of the annular cavities 64 in a tangential direction, as shown in Fig. 9. Each of the gates 65 is connected to a common sprue passage 66 through which the plastic material is conducted from a suitable pressure source.

The material thus flows through the sprue passage 66 and thence radially along the gates 65 to the respective cavities 64, one gate only being associated with each cavity. In the annular cavities 64, the material flows in the direction in which it enters the cavity, the initial portion of each stream forming a leading edge 68. This leading edge 68 travels completely around the cavity and finally merges into the relatively more plastic edge 69 adjacent the entrance of the gate 65 to the cavity 64.

From the above description, it will be seen that a novel method of injecting thermoplastic material into a mold cavity has been conceived. The angular disposition of the gate with respect to the cavity prevents the material entering the cavity from distorting the insert or core. It also assures the formation of a smooth integral connection between the relatively cool and congealed edge of one stream with the relatively more plastic edge adjacent the entrance of the gate into the cavity. This plastic edge is constantly changing during the injecting operation and does not move appreciably from the entrance of the gate. This portion of the cavity is maintained at a higher temperature than the remaining portion due to the fact that the hot plastic material is frequently passing through the gate and the heat from the material is absorbed by the mold. Furthermore, this method of injection is particularly suitable in molding materials of various colors. The streamline disposition of the gates relative to the cavity assures the formation of contrasting color designs on the article since there is little tendency for the material to become intimately mixed during injection.

Having thus described my invention, what I claim is:

1. The method of molding plastic material which comprises injecting the material at high pressure into a cavity at a plurality of separated points and in a direction from each point toward the point of injection next succeeding in the direction of initial injection, and maintaining the injection pressure to cause overlapping of the leading end of one injected stream with the material at the next succeeding point.

2. The method of molding material which is plastic at predetermined temperatures, which comprises injecting the material under pressure into a mold cavity at a plurality of separated points, causing confluence of a leading portion of each stream with another stream close to the region of entrance of the other stream into the cavity.

3. The method of molding thermally moldable material comprising injecting the material in heated and plastic condition at relatively high velocity and under pressure into a mold cavity defining an endless passage, and causing substantially all of the material to move in said endless passage in the same peripheral direction.

4. The method of molding articles of plastic materials which comprises injecting the material into a continuous mold cavity under pressure at a predetermined portion in the cavity, causing substantially all of the injected material to flow in a single stream in the same peripheral direction around the said continuous cavity, and then causing the leading edge of the said stream to meet and unite with the material entering the cavity at the said predetermined portion.

5. The method of molding an article of thermally moldable material comprising injecting the material while in the plastic condition and under high pressure into a mold cavity defining a continuous passage from a plurality of separated points distributed around the continuous passage, causing substantially all of the injected material from each point of injection to flow in the same peripheral direction around the cavity passage until the said cavity passage is completely filled with material.

6. The method of forming a coating of thermally moldable material around a preformed article comprising placing the article in spaced relation from the surface of a mold cavity wall, the space between the surface of the article and the cavity wall defining a continuous passage, injecting the material in heated and plastic condition and under pressure into the said continuous passage in a direction to cause substantially all of the injected material to flow as a single stream in the same peripheral direction around the continuous passage until the leading edge of the 2,199,144 merges into the material last injected into the said continuous passage.

7. The method of forming a coating of thermoplastic material around a preformed article comprising placing the said article in spaced relation from the surface of a mold cavity wall so as to define a continuous peripheral passage around the article, injecting the material in heated and plastic condition and under pressure into the continuous peripheral passage at a predetermined zone and in a direction to cause substantially all of the injected material to flow in a single stream around the said continuous passage in the same peripheral direction, maintaining the temperature of the cavity wall at a degree sufficient to chill and partially set the material after it comes in contact therewith, and finally causing the relatively more heated and plastic material entering the continuous passage at the said predetermined zone.

8. The method of molding thermal material which comprises injecting the material from a plurality of separate passages into an elongated mold cavity so that substantially all of the material entering the cavity from each passage moves in the same general direction along the cavity, and causing the leading end of the one stream injected through one of said passages to engage and merge with the stream of fresh material injected into the cavity from the next succeeding passage in the direction of travel of said leading edge of said one stream.

9. In molding plastic material of the kind described, the procedure consisting of injecting the material into an elongated cavity at a region thereof from which the cavity extends in opposite directions, and introducing the material to the cavity at a narrow acute angle to a region of introduction, so that the material moves substantially only in one direction of the cavity.

10. The method of molding thermal plastic or thermal setting material which comprises injecting all of the material necessary to form a single molding under pressure into a mold cavity defining a continuous elongated endless passage in a direction at an acute angle to the longitudinal axis of the passage at the point of material thereto, so that substantially all of said passage